(12) United States Patent
Kuipers (10) Patent No.: US 9,338,282 B2
(45) Date of Patent: May 10, 2016

(54) DATA PROCESSING IN A DIGITAL SUBSCRIBER LINE ENVIRONMENT

(71) Applicant: Adtran Inc., Huntsville, AL (US)

(72) Inventor: Martin Kuipers, Dallgow-Döberitz (DE)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 14/477,440

(22) Filed: Sep. 4, 2014

(65) Prior Publication Data

US 2015/0063551 A1 Mar. 5, 2015

(30) Foreign Application Priority Data

Sep. 5, 2013 (EP) .................................. 131831414

(51) Int. Cl.
| | |
|---|---|
| *H04M 1/24* | (2006.01) |
| *H04M 3/08* | (2006.01) |
| *H04M 3/22* | (2006.01) |
| *H04M 3/34* | (2006.01) |
| *H04M 3/12* | (2006.01) |
| *H04B 3/32* | (2006.01) |
| *H04B 3/487* | (2015.01) |
| *H04M 3/30* | (2006.01) |
| *H04L 1/24* | (2006.01) |

(52) U.S. Cl.
CPC . *H04M 3/34* (2013.01); *H04B 3/32* (2013.01); *H04B 3/487* (2015.01); *H04M 3/12* (2013.01); *H04M 3/2209* (2013.01); *H04L 1/24* (2013.01); *H04M 3/305* (2013.01)

(58) Field of Classification Search
CPC ..... H04M 3/306; H04M 11/062; H04M 1/24; H04M 3/304; H04M 3/30; H04M 3/305
USPC ....................... 379/1.01, 1.03, 1.04, 22.03, 24
See application file for complete search history.

(56) References Cited

U.S. PATENT DOCUMENTS

| | | | |
|---|---|---|---|
| 7,809,116 B2 * | 10/2010 | Rhee ........................ | H04B 3/48 379/1.03 |
| 7,995,464 B1 * | 8/2011 | Croak et al. .................. | 370/218 |
| 2002/0110221 A1 * | 8/2002 | Norrell .................... | H04B 3/46 379/22.03 |
| 2005/0041782 A1 * | 2/2005 | Qiu ............................ | 379/27.01 |
| 2005/0163286 A1 * | 7/2005 | Jiang et al. .................... | 379/1.04 |
| 2011/0188640 A1 * | 8/2011 | Cioffi .................. | H04L 41/0803 379/27.01 |
| 2012/0082258 A1 | 4/2012 | Nuzman et al. | |
| 2012/0306895 A1 * | 12/2012 | Faulkner et al. .............. | 345/501 |

FOREIGN PATENT DOCUMENTS

EP              1962437 A1      8/2008

OTHER PUBLICATIONS

Extended European Search Report for EP Application No. 13183141.4 issued on Jan. 31, 2014, 7 pages.

\* cited by examiner

*Primary Examiner* — Quoc D Tran
(74) *Attorney, Agent, or Firm* — Fish & Richardson P.C.

(57) ABSTRACT

Methods, systems, and apparatus, including computer programs encoded on a computer storage medium, for data processing in a digital subscriber line environment are provided. In one aspect a method includes (i) determining a deterioration of a connection between a centralized unit and a decentralized unit during an initialization of the connection; and (ii) disabling the connection based on the deterioration.

19 Claims, 5 Drawing Sheets

DATA PROCESSING IN A DIGITAL SUBSCRIBER LINE ENVIRONMENT

CROSS-REFERENCE TO RELATED APPLICATIONS

This application claims the benefit under 35 U.S.C. §119 (a) of European Patent Application No. 13183141.4, entitled "Data processing in a digital subscriber line environment," filed Sep. 5, 2013, which is incorporated herein by reference in its entirety.

BACKGROUND

This document relates to data processing in a digital subscriber line environment.

DSL or xDSL is a family of technologies that provide digital data transmission over the wires of a local telephone network.

Requirements for high speed Internet access are increasing. Operators are optimizing services that are offered to their customers. This becomes a difficult task as an increasing amount of users as well as high data rates leads to higher crosstalk between subscriber lines in a cable binder. In most cases, crosstalk noise limits the performance. However, the actual problem is that crosstalk noise varies over time: There may be low crosstalk noise when a significant amount of customers switched off their equipment and there may be a considerable amount of crosstalk noise during business hours when the majority of customers use their devices.

SUMMARY

In general, one innovative aspect of the subject matter described in this specification can be embodied in methods that include the actions of determining a deterioration of a connection between a centralized unit and a decentralized unit during an initialization of the connection; disabling the connection based on the deterioration. Other embodiments of this aspect include corresponding systems, apparatus, and computer programs, configured to perform the actions of the methods, encoded on computer storage devices.

These and other embodiments can each optionally include one or more of the following features. The connection between the centralized unit and the decentralized unit can be part of a vectoring group.

Methods can include the actions of determining the deterioration of the connection based on an information about an attenuation in particular with regard to a frequency band. Methods can include the actions of determining the deterioration of the connection based on an information about an attenuation in particular with regard to a low frequency band in case such deterioration reaches and/or exceeds a predetermined threshold.

The information about the attenuation can be provided by at least one of the following parameters: a line attenuation per band; a signal attenuation per band; an estimated upstream power back-off electrical length.

Methods can include the actions of determining the deterioration of the connection by comparing a value of the line attenuation per band with an electrical length value and/or by comparing the attenuations of two bands. Methods can include the actions of determining the deterioration of the connection in case the following first criterion is fulfilled: LATN(US0)>UPBOKLE(VTUO)*$X_D$+$X_A$, where LATN(US0) is a line attenuation for the first upstream band US0; UPBOKLE(VTUO) is an estimated upstream power back-off electrical length value measured by a VDSL Transceiver Unit at the Optical Network Unit (VTU-O); $X_A$ is a tuning parameter to modify the threshold of the detection; and $X_D$ represents a factor between two attenuations.

Methods can include the actions of determining the deterioration of the connection based on a testing functionality, in particular a loop testing functionality. Testing functionality can include a line testing functionality determining at least one capacitance value for the connection.

Methods can include the actions of determining the deterioration of the connection in case the following second criterion is fulfilled: $C_{ab} < X_L * \max(C_{ae}, C_{be}) + X_C$, where $C_{ab}$ is a capacitance between a wire a and a wire b of the connection; $X_L$ is a cable-dependent factor; $C_{ae}$ is a capacitance between the wire a and earth; $C_{be}$ is a capacitance between the wire b and earth.

Methods can include the actions of determining the deterioration of the connection in case the following second criterion is fulfilled: $C_{ab} < X_L * \max(C_{ae}, C_{be}) * \max(C_{ae}, C_{be}) / \min(C_{ae}, C_{be}) + X_C$, where $C_{ab}$ is a capacitance between a wire a and a wire b of the connection; $X_L$ is a cable-dependent factor; $C_{ae}$ is a capacitance between the wire a and earth; $C_{be}$ is a capacitance between the wire b and earth; $X_C$ is an optional tuning parameter to modify the sensitivity of the detection.

Methods can include the actions of determining the deterioration of the connection based on the information about the attenuation and based on a line testing functionality; and determining at least one capacitance of the connection by comparing a weighted sum with a predetermined threshold as follows: $w_a*(LATN(US0)-UPBOKLE(VTUO)*X_D'+X_A')+w_c*(X_L*\max(C_{ae}, C_{be})+X_C-C_{ab})>T$, and/or $w_a*(LATN(US0)-UPBOKLE(VTUO)*X_D'+X_A')+w_c*(X_L*\max(C_{ae}, C_{be})*\max(C_{ae}, C_{be})/\min(C_{ae}, C_{be})+X_C-C_{ab})>T$, where $w_a$ is a weighting factor for the attenuation-based criterion; $w_c$ is a weighting factor for the capacitance-based criterion; T is the predetermined threshold; LATN(US0) is a line attenuation for the first upstream band US0; UPBOKLE(VTUO) is an estimated upstream power back-off electrical length value measured by a VDSL Transceiver Unit at the Optical Network Unit (VTU-O); $X_A'$ is a tuning parameter to modify the threshold of the detection; $X_D'$ represents a factor between two attenuations; $C_{ab}$ a capacitance between a wire a and a wire b of the connection; $X_L$ a cable-dependent factor; $C_{ae}$ a capacitance between the wire a and earth; $C_{be}$ a capacitance between the wire b and earth; $X_C$ is an optional tuning parameter to modify the sensitivity of the detection.

Methods can include the actions of determining the deterioration via a first criterion and a second criterion, wherein the first criterion is determined based on a parameter available during initialization and wherein the second criterion is determined if the first criterion is fulfilled; and disabling the connection in case the first criterion and the second criterion are fulfilled. The first criterion can be based on an attenuation provided by at least one of the following parameters: a line attenuation per band; a signal attenuation per band; an estimated upstream power back-off electrical length. The second criterion can be based on a loop testing functionality, in particular a line testing functionality determining at least one capacitance value for the connection, wherein the loop testing functionality is initiated by the centralized unit.

Disabling the connection can include shutting down the connection and/or locking the connection. Disabling the connection can include entering a fallback mode for the connection, in particular with regard to a predefined frequency range and/or a predefined power spectral density.

DETAILED DESCRIPTION

High speed internet access is gaining importance and is often realized via VDSL2 (G.993.2) services using existing copper lines. Internet access and an increasing amount of applications each require broadband transmission services. In a so-called triple play offer a subscriber may utilize a single access service for Internet, TV and voice data transmission. In such scenario, TV via DSL consumes a significant amount of bandwidth, e.g., 12 Mbit/s for an HDTV channel.

Hence, requirements for high speed Internet access are getting more demanding leading to data rates of 100 Mbit/s and beyond. A reach of such high data rate services may still be limited to rather short distances, because of signal attenuation on the line and because of unwanted crosstalk of signals between lines. These detrimental effects can at least partially be reduced by compensating a far-end self-crosstalk. Such a technique is called vectoring and specified by ITU-T in G.993.5.

A digital subscriber line access multiplexer (DSLAM) may be realized as a component that aggregates a large number of subscribers. The DSLAM may therefore comprise several modems, wherein each modem is connected via a line to one decentralized component, e.g., a customer premises equipment (CPE). Hence, in downlink direction, the DSLAM is connected via several lines to several CPEs. In uplink direction, the DSLAM may be connected to a frame relay or an asynchronous transfer mode (ATM) backbone network, e.g., a switch or a router. The modems that are connected via a line are initialized and after successful initialization may enter a Showtime state. According to ITU-T, Showtime is a state of either the VTU-O or VTU-R that is reached after the initialization procedure has been completed in which bearer channel data are transmitted.

Figure 1:
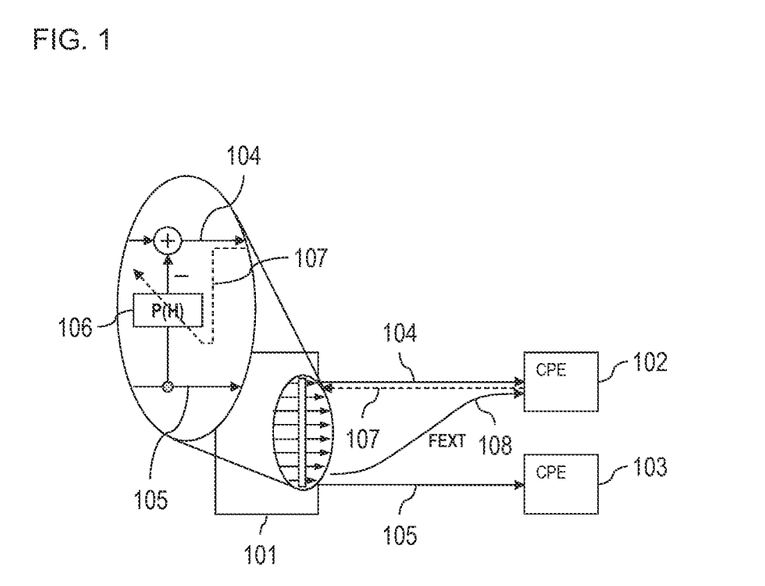
FIG. 1 shows a schematic diagram visualizing vector processing in downstream direction.

FIG. 1 shows a schematic diagram visualizing vector processing in downstream direction, i.e. from a vectoring DSLAM 101 towards CPEs 102, 103. In the example of FIG. 1, data is sent from the DSLAM 101 to the CPE 102 via a line 104 and to a CPE 103 via a line 105. The data transmitted via the line 105 disturbs (as far-end crosstalk, FEXT 108) the data transmitted via the line 104 and is thus weighted with a channel-dependent coefficient 106 and subtracted from the signal to be sent across the line 104 (also referred to as pre-coding). A feedback information 107 from the CPE 102 to the DSLAM 101 is used to adjust the channel dependent coefficient P(H). The feedback information 107 may be based on an error vector.

Figure 2:
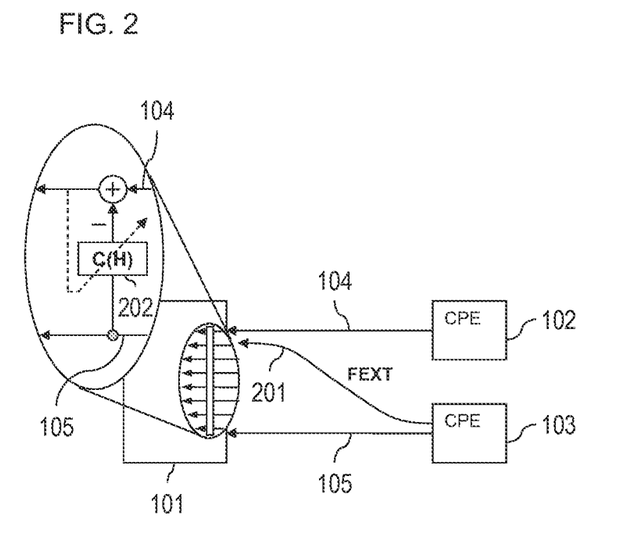
FIG. 2 shows a schematic diagram visualizing vector processing in upstream direction.

FIG. 2 shows a schematic diagram visualizing vector processing in upstream direction, i.e. from the CPE 102 to the DSLAM 101. Here, the signal from the disturber line 105 is weighted with a channel dependent coefficient C(H) 202 and subtracted from the signal received via the line 104 at the DSLAM. This allows for at least partially compensating the far-end crosstalk FEXT 201 from the CPE 103 before demodulating the received signal.

Such processing (even for more than the two lines shown) can be provided by a centralized or distributed vectoring engine in real-time using complex matrix operations involving the signals of all lines to be processed. All lines that are considered in the crosstalk compensation and are processed together form the vectoring group.

Vectoring enables data transmission at high data rates by compensation of self-crosstalk. Cancellation of crosstalk increases the effective signal-to-noise ratio so that more information can be transmitted on the individual subcarriers. However, this results in the system being more vulnerable to noise that cannot be compensated. Such noise may be based on, e.g., alien crosstalk, legacy VDSL2 systems in the same cable binder, RFI ingress, impulse noise, etc. Due to the low level of residual noise, a single additional VDSL2 signal which is not part of the vectoring group can deteriorate the signal-to-noise ratio severely so that data transmission is no longer feasible and the line needs to re-initialize.

Similar effects can occur in case crosstalk coupling between lines or signal levels suddenly change, e.g., in case a single wire (also referred to as "line") of a vectoring system is interrupted.

Figure 3:
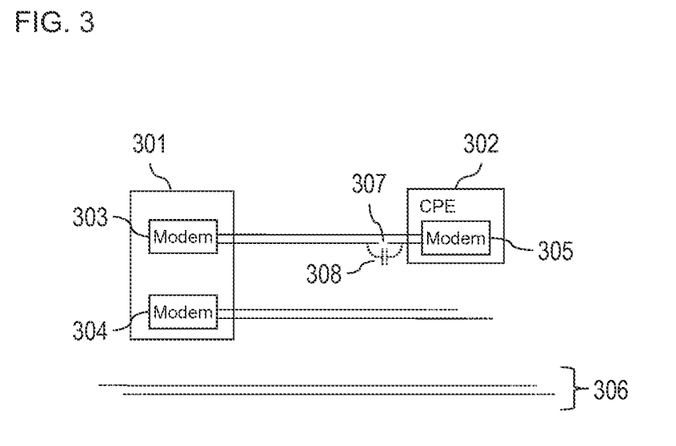
FIG. 3 depicts a vectoring system comprising a vectoring digital subscriber line access multiplexer (DSLAM) with two modems.

FIG. 3 depicts a vectoring system comprising a vectoring DSLAM 301 with two modems 303, 304, wherein the modem 303 is connected to a modem 305 of a CPE 302. The connection between the modem 303 and the modem 305 comprises two wires, wherein one of the wires is interrupted (see reference 307). The modems 303 to 305 may be VDSL2 modems.

The connections of the DSLAM 301 to the CPE 302 and to other CPEs (not shown in FIG. 3) may establish a vectored group. FIG. 3 also shows two wires of another connection 306 that may or may not part of the vectored group.

It is assumed that all modems are in Showtime state and are performing vectoring. Next, one of the wires of a connection between the modems 303 and 305 experiences an interruption due to, e.g., a real break, corroding or intermittent contacts in a socket, etc. This results in a sudden loss of signal level and a transmission to this CPE 302 is no longer feasible. The modem 303 in the DSLAM 301 and the modem 305 in the CPE 302 will then shut down the transmission.

An interruption of a single wire does not mean that the electrical signal between the two modems 303 and 305 is completely off. Usually, multiple wire pairs are running in parallel, e.g., loops belonging to other customers or just spare pairs (see connection 306). In most cases even home wiring uses two cable pairs with only a single pair being actually used. Wire pairs running in parallel provide capacitive coupling effects that cause crosstalk between such lines. For the interrupted wire these couplings have the same effect as a small capacitor 308 that bridges the interruption 307. Hence, high-frequency signals can pass between the two modems 303 and 305 with an additional attenuation. As a DC signal is not required for DSL communication the interrupted connection (line) may re-initialize even with a single wire being interrupted. During such initialization the system will adapt to the new channel characteristic and the highly attenuated signal at lower frequencies. As a consequence, the line may reach Showtime state and re-enter the vectoring group. Crosstalk between the lines has significantly changed due to this single wire interruption, but the vectoring system adapted to these changes when the defective connection joined the vectoring group. Eventually, the communication may continue even with this interruption 307, wherein crosstalk of the vectoring group is compensated as described above.

In case the interrupted wire is reconnected again (e.g. due to an intermittent contact) the loop attenuation of the affected line suddenly decreases. As the signal-to-noise ratio of the connection between the model 303 and the modem 305 is not degraded severely, the transmission between these modems 303 and 305 continues without errors. However, the other lines of the vectoring group will experience a sudden increase of crosstalk that cannot be compensated. On the one hand, the signal level of the crosstalk may increase. On the other hand, the reconnection of the interruption 307 may have a significant impact on the crosstalk coupling between the lines. The adaptation of the system is usually not fast enough to prevent the other lines of the vectoring group from losing connectivity. Hence, a sudden increase of crosstalk that cannot be compensated may result in a loss of Showtime state for many if not all (other) lines of a vectoring group.

Such re-connection of a single line may result in an interruption of DSL connectivity for several lines of a vectoring group. Hence, deliberately interrupting and re-connecting a single line of a subscriber which is part of the vectoring group may sabotage the connections of the other subscribers of the vectoring group and thus affect the operation and user acceptance of the whole vectoring approach.

One example problem to be solved is to overcome the disadvantages stated above and in particular to provide a favorable and stable solution for vectoring groups in case one subscriber of such group experiences a line failure.

This problem can be solved according to the features of the claims. For example, a method for data processing in a digital subscriber line environment is suggested, the method including the steps: determining a deterioration of a connection between a centralized unit and a decentralized unit during an initialization of the connection; and disabling the connection based on the deterioration.

The centralized unit may be any entity comprising at least one modem, in particular several modems, to be connected to a modem of the decentralized unit. The centralized unit may be a DSLAM or a central office (CO). The decentralized unit may be a customer premises equipment (CPE).

Disabling the connection may include a temporary or permanent shut down, entering a fallback mode, locking the connection in a predetermined state, limiting the features of the connection or the like.

Embodiments described herein may be understood as examples and/or implementations.

In some implementations, the connection between the centralized unit and the decentralized unit is part of a vectoring group.

The centralized unit may in particular control at least one such vectoring group. The vectoring group may be based on VDSL2 (ITU-T G993.2 and G993.5).

In some implementations, methods for data processing in a digital subscriber line environment can include determining the deterioration of the connection based on an information about an attenuation in particular with regard to a frequency band.

Hence, the deterioration of the connection can be determined (at least in part) based on an attenuation, wherein the attenuation may relate to a particular frequency band or range.

In some implementations, methods for data processing in a digital subscriber line environment can include determining the deterioration of the connection based on an information about an attenuation in particular with regard to a low frequency band in case such deterioration reaches and/or exceeds a predetermined threshold. For example, if the threshold is reached or exceeded, the deterioration may (at least in part) be determined.

In some implementations, the information about the attenuation is provided by at least one of the following parameters: a line attenuation per band; a signal attenuation per band; or an estimated upstream power back-off electrical length. Any of these parameters may be derived from an attenuation measurement, in particular determined by an attenuation per tone measurement. The parameters are advantageously parameters that are available during initialization of the connection. Preferably, obtaining such parameters does not require time-consuming and/or complex measurements.

Methods for data processing in a digital subscriber line environment can also include determining the deterioration of the connection by comparing a value of the line attenuation per band with an electrical length value and/or by comparing the attenuations of two bands. In some implementations, the determination of the deterioration of the connection is performed in case the following first criterion is fulfilled:

$$LATN(US0) > UPBOKLE(VTUO) * X_D + X_A,$$

wherein

LATN(US0) is a line attenuation for the first upstream band US0;

UPBOKLE(VTUO) is an estimated upstream power back-off electrical length value measured by a VDSL Transceiver Unit at the Optical Network Unit (VTU-O);

$X_A$ is a tuning parameter to modify the threshold of the detection; and $X_D$ represents a factor between two attenuations (representing a difference in attenuation between the considered frequency ranges).

In some implementations, methods for data processing in a digital subscriber line environment can include determining the deterioration of the connection based on a testing functionality, in particular a loop testing functionality. The testing functionality can include a line testing functionality determining at least one capacitance value for the connection.

Methods for data processing in a digital subscriber line environment can include determining the deterioration of the connection in case the following second criterion is fulfilled:

$$C_{ab} < X_L * \max(C_{ae}, C_{be}) + X_C,$$

wherein $C_{ab}$ is a capacitance between a wire a and a wire b of the connection;

$X_L$ is a cable-dependent factor;

$C_{ae}$ is a capacitance between the wire a and earth;

$C_{be}$ is a capacitance between the wire b and earth.

In some implementations methods for data processing in a digital subscriber line environment can include determining the deterioration of the connection in case the following second criterion is fulfilled:

$$C_{ab} < X_L * \max(C_{ae}, C_{be}) * \max(C_{ae}, C_{be}) / \min(C_{ae}, C_{be}) + X_C,$$

wherein $C_{ab}$ is a capacitance between a wire a and a wire b of the connection;

$X_L$ is a cable-dependent factor;

$C_{ae}$ is a capacitance between the wire a and earth;

$C_{be}$ is a capacitance between the wire b and earth;

$X_C$ is an optional tuning parameter to modify the sensitivity of the detection.

Methods for data processing in a digital subscriber line environment can include determining the deterioration of the connection based on the information about the attenuation and based on a line testing functionality determining at least one capacitance of the connection by comparing a weighted sum with a predetermined threshold as follows:

$$w_a*(\text{LATN(US0)}-\text{UPBOKLE(VTUO)}*X_D'+X_A')++$$
$$w_c*(X_L*\max(C_{ae},C_{be})+X_C-C_{ab})>T,$$

and/or $$w_a*(\text{LATN(US0)}-\text{UPBOKLE(VTUO)}*X_D'+X_A')++$$
$$w_c*(X_L*\max(C_{ae},C_{be})*\max(C_{ae},C_{be})/\min(C_{ae},C_{be})+X_C-C_{ab})>T,$$

wherein
$w_a$ is a weighting factor for the attenuation-based criterion;
$w_c$ is a weighting factor for the capacitance-based criterion;
T is the predetermined threshold;
LATN(US0) is a line attenuation for the first upstream band US0;
UPBOKLE(VTUO) is an estimated upstream power back-off electrical length value measured by a VDSL Transceiver Unit at the Optical Network Unit (VTU-O);
$X_A'$ is a tuning parameter to modify the threshold of the detection;
$X_D'$ represents a factor between two attenuations (representing a difference in attenuation between the considered frequency ranges);
$C_{ab}$ a capacitance between a wire a and a wire b of the connection;
$X_L$ a cable-dependent factor;
$C_{ae}$ a capacitance between the wire a and earth;
$C_{be}$ a capacitance between the wire b and earth;
$X_C$ is an optional tuning parameter to modify the sensitivity of the detection.

In some implementations, methods for data processing in a digital subscriber line environment can include determining the deterioration via a first criterion and a second criterion, where the first criterion is determined based on a parameter available during initialization and where the second criterion is determined if the first criterion is fulfilled. The methods can also include disabling the connection in case the first criterion and the second criterion are fulfilled.

The first criterion can be based on an attenuation provided by at least one of the following parameters: a line attenuation per band; a signal attenuation per band; or an estimated upstream power back-off electrical length. The second criterion can be based on a loop testing functionality, in particular a line testing functionality determining at least one capacitance value for the connection, where the loop testing functionality is initiated by the centralized unit.

In some implementations, disabling the connection includes shutting down the connection and/or locking the connection. Disabling the connection may alternatively, or additionally, include entering a fallback mode for the connection, in particular with regard to a predefined frequency range and/or a predefined power spectral density.

A device for data processing in a digital subscriber line environment can include a processing unit that is arranged for determining a deterioration of a connection between the device and a decentralized unit during an initialization of the connection, and for disabling the connection based on the deterioration. The device can be a DSLAM or a central office, where the DSLAM may be deployed at a central office or at a cabinet.

It is noted that the steps of the method stated herein may be executable on this processing unit or device as well. It is further noted that said processing unit can comprise at least one, in particular several means that are arranged to execute the steps of the method described herein. The means may be logically or physically separated; in particular several logically separate means could be combined in at least one physical unit. The processing unit may comprise at least one of the following: a processor, a microcontroller, a hard-wired circuit, an ASIC, an FPGA, a logic device.

A computer program product directly loadable into a memory of a digital computer, can include software code portions for performing the steps of the method as described herein. A computer-readable medium, e.g., storage of any kind, having computer-executable instructions can be adapted to cause a computer system to perform operations of methods described herein. A communication system can include at least one device as described herein.

A system can include means for determining a deterioration of a connection between the device and a decentralized unit during an initialization of the connection. The system can also include means for disabling the connection based on the deterioration.

Implementations and/or embodiments are shown and illustrated with reference to the drawings. The drawings serve to illustrate the basic principle, so that only aspects necessary for understanding the basic principle are illustrated. The drawings are not to scale. In the drawings the same reference characters denote like features.

Figure 4:
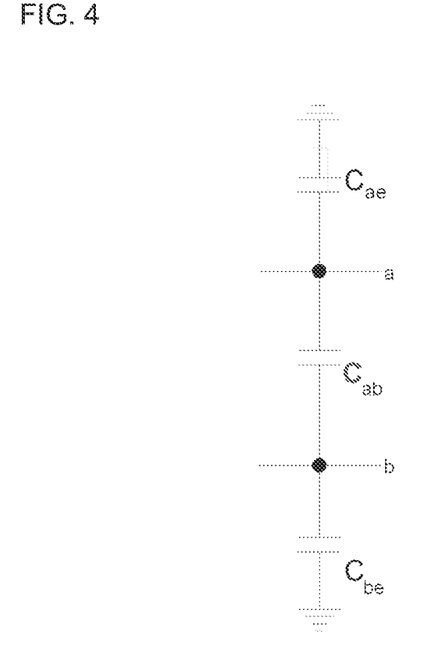
FIG. 4 shows a diagram illustrating several capacitances that may be subject to a Metallic Line Testing (MELT) capacitance measurement.
Figure 5:
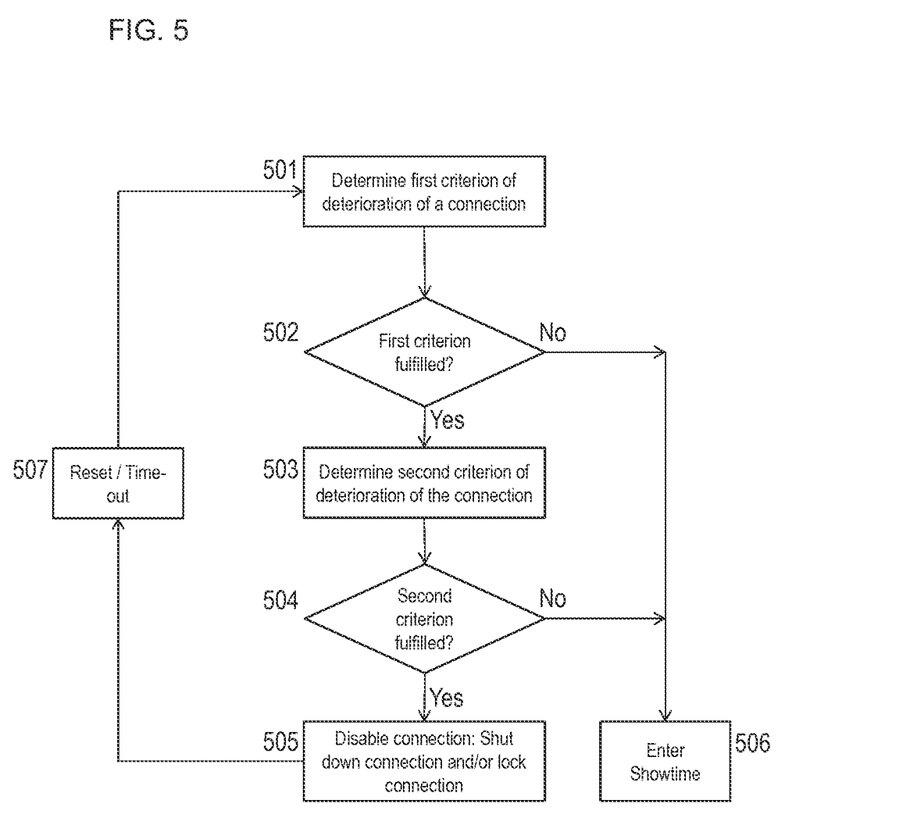
FIG. 5 shows a flow chart of steps for determining a deterioration of a connection.

FIG. 4 shows a diagram illustrating several capacitances that may be subject to a MELT capacitance measurement;

FIG. 5 shows a flow chart of steps for determining a deterioration of a connection, e.g., an interrupted wire.

A central entity may be a DSLAM, a central office (CO) and/or a cabinet. The DSLAM may in particular be deployed with the central office or the cabinet. The central entity may be connected to several de-centralized entities, e.g., CPEs. The central entity may hereinafter be referred to as DSLAM, but the approach described may be applicable to other centralized entities as well.

The central entity may comprise at least one line card, wherein each line card may provide connectivity to at least one of the de-centralized entities. For example, a DSLAM may be connected to several CPEs, wherein each connection (also referred to as "line") may comprise two wires (or a pair of wires). Several wires may be part of a cable or cable binder. Hence, adjacent connection may interfere with each other, because their wires are arranged in vicinity to each other.

The approach presented in particular allows detecting an interrupted wire (i.e. an interrupted connection or line) after or during re-initialization, e.g., during or directly after entering the Showtime state, of the line with the interrupted wire. When the affected DSL line with a single wire interruption loses its Showtime state, it may re-initialize thereby utilizing a capacitive coupling effect to adjacent cable pairs. This capacitive coupling may be detected via known, in particular standardized, DSL test parameters.

For example, it may be determined that an attenuation of the lines at low frequencies is higher due to the capacitive coupling with adjacent wires. In case a line card has an integrated MELT (Metallic Line Testing) functionality, this MELT feature may be used to measure the capacitance of the line. The capacitive coupling of a defective line results in a reduced capacitance. When an interruption of a wire is detected, the line can be shut down before a reconnection attempt is performed. Hence, the line is shut down and may thus not disturb other connections, in particular those connections of the same vectoring group.

The approach described herein in particular allows detecting a single wire interruption (e.g., based on a higher attenuation) during initialization.

In principle it is possible to detect a positive slope of a loop attenuation in a lower frequency range as an indication of a single wire interruption. However, such values may not be available in the system immediately after its initialization. As a potential interruption of a wire is determined during each initialization, this can generate a significant amount of system load especially during a system start-up when hundreds of lines are being starting in parallel.

Hence, advantageously, other test parameters may be used for detecting such interruption. For example, such detection may be based on any xDSL test parameter that provides information (values) about attenuation in different frequency bands, e.g., a line attenuation per band (LATN);
a signal attenuation per band (SATN);
an estimated upstream power back-off electrical length (UPBOKLE).

A suitable approach to detect the interruption of a wire may exemplarily be achieved by comparing the LATN value for a first upstream band (US0) with an electrical length (UPBOKLE) value measured by a VDSL Transceiver Unit at the Optical Network Unit (VTU-O), i.e. an UPBOKLE(VTUO) value. The upstream band US0 may have the lowest attenuation of all bands due to its low frequency range (e.g., 0-276 kHz). In case of no wire interruption, the attenuation should be lower than in other bands. A suitable value for comparison is the UPBOKLE value, because it refers to the estimated electrical length expressed in dB at 1 MHz.

In a usual system, UPBOKLE is larger than LATN(US0).

Advantageously, a single frequency at 1 MHz can be used to estimate the electrical length. Also, it is possible to use a frequency range, e.g., above 1 MHz to estimate the electrical length at 1 MHz by (at least partially) compensating the frequency-dependency of the attenuation.

Therefore, a single wire interruption may be detected via the following condition:

$$\text{LATN(US0)} > \text{UPBOKLE(VTUO)} * X_D + X_A,$$

wherein $X_A$ is a tuning parameter to modify the threshold of the detection; and
$X_D$ represents a factor between two attenuations (representing a difference in attenuation between the considered frequency ranges).

An attenuation of an xDSL subscriber-loop under normal condition may be approximately proportional to the square root of the frequency in MHz (e.g., insertion loss in dB at 207 kHz is about 0.455 of the value at 1 MHz). The difference $X_D$ could also be used to change the sensitivity of the detection dependent on the loop length or to correct hardware impairments.

This detection of a single wire interruption may be conducted during or after each initialization. It may be based on standard compliant test parameters that may be available in the system. The parameters utilized may preferably be exchanged during initialization and may be evaluated directly at the beginning of the Showtime stage or even earlier. Additional steps may optionally be considered in order to decide whether or not to disable a port. For example, a second criterion can be used to reaffirm the existence of a single wire interruption. Available loop-test functionalities can be used for this purpose.

For example, existing xDSL systems have often integrated loop test functionality known as Metallic Line Testing (MELT based on G.996.2). MELT in particular allows measuring of voltages, currents, resistances and capacitances.

FIG. 4 shows a diagram illustrating several capacitances that may be subject to a MELT capacitance measurement. Hence, a MELT equipment allows measuring three capacitance values from the DSLAM for every DSL line:

Capacitance between a wire and ground: $C_{ae}$;
Capacitance between a wire and b wire: $C_{ab}$;
Capacitance between a wire and ground: $C_{be}$.

In a system that works correctly each line has a certain capacitance value $C_{ab}$ between its a wire and its b wire. If a single wire is interrupted, the capacitance $C_{ab}$ will be reduced significantly due to the capacitance of the capacitive coupling that is in series with the capacitance of the CPE and/or the line termination. Therefore, one way to detect a broken wire is to measure the capacitance $C_{ab}$ and to compare it with a capacitance $C_{ab}'$ measured during each initialization. A single wire defect can be determined in case $$C_{ab}' << C_{ab}.$$

Such comparison requires that the reference value for the capacitance $C_{ab}$ is measured and stored in advance for each line. This may result in a significant effort and adds complexity to the system.

As an alternative, the capacitance of the cable may be determined (approximated) by:

$$C_{abL} \approx X_L * \max(C_{ae}, C_{be}),$$

wherein $X_L$ is a cable-dependent factor. During normal operation, the measured capacitance may always be larger than the capacitance $C_{abL}$. Therefore, a single wire defect can be detected if the following condition applies:

$$C_{ab} < X_L * \max(C_{ae}, C_{be}) + X_C,$$

wherein $X_C$ is an optional tuning parameter to modify the sensitivity of the detection.

In other cases, e.g. in case of an interruption in the middle of a long and large cable binder, the above mentioned condition may not reveal an interruption of a wire correctly, because of strong capacitive coupling effects. However, if the interruption is at a significant distance from the CPE, both wires are of different length. Therefore, the capacitance to earth is also different. This asymmetry can be detected by comparing the capacitance $C_{ae}$ with the capacitance $C_{be}$. Hence, the detection criterion can be modified as follows:

$$C_{ab} < X_L * \max(C_{ae}, C_{be}) * \max(C_{ae}, C_{be}) / \min(C_{ae}, C_{be}) + X_C.$$

The combination of the two detection mechanisms can provide several advantages. First, the detection can be made more reliable. Second, the resources to perform capacitance measurements are limited, because usually measurements can be conducted on all ports of a line card but not at the same time in parallel. Therefore, advantageously the capacitance measurements are performed only in case the attenuation based detection has already been indicated that a wire may be defective.

As another option or alternative, the detection may be based on a weighted sum of both criteria, i.e.

$$w_a * (\text{LATN(US0)} - \text{UPBOKLE(VTUO)} * X_D' + X_A') ++ w_c * (X_L * \max(C_{ae}, C_{be}) + X_C - C_{ab}) > T,$$

wherein $w_a$ is a weighting factor for the attenuation-based criterion and $w_c$ is a weighting factor for the capacitance-based criterion. A single wire fault is detected in case this sum exceeds a predetermined threshold T.

As an alternative, the detection may be based on a weighted sum of both criteria utilizing also the asymmetry detection described above, i.e.

$$w_a*(LATN(US0)-UPBOKLE(VTUO)*X_D'+X_A')++$$
$$w_c*(X_L*\max(C_{ae},C_{be})*\max(C_{ae},C_{be})/\min(C_{ae},C_{be})+X_C-C_{ab})>T$$

The evaluation of this combined detection may only be performed in case the attenuation based criteria was triggered. The tuning parameters $X_A$ and $X_A'$ may be different form each other or they may be the same. Also, the parameters $X_D$ and $X_D'$ may be different from each other or they may be the same.

In case a single wire defect is detected, actions can be initiated to ensure that the affected line does not disturb other lines of a vectoring group: First, the defective line may be shut down. Next, the defective line may be locked such that it cannot be initialized when still being defective. As an option or alternative, the defective line may be initialized in a fallback mode that limits a spectrum usage to a frequency range (e.g., 2.2 MHz in ADSL2plus) and/or to a lower power spectral density (PSD) level that ensures that the other lines of the vectoring group are not (or not significantly) disturbed by a reconnection of the defective line.

The defective connection may be re-initialized after it has been repaired. The connection can thus be manually be reactivated (e.g., unlocked). It is also an option that a retry-timer is used to re-initialize a disabled line: after a predetermined amount of time, a re-initialization is conducted which may indicate that the line is still defective or it may be initialized. The retry-timer may supply constant time intervals or it may provide, e.g., exponentially growing back-off times: Starting with 30 s, 1 min, 2 min, 5 min, etc.

FIG. 5 shows a flow chart of steps for determining a deterioration of a connection, e.g., an interrupted wire. In a step 501 a first criterion of deterioration is determined (which may correspond to the attenuation described above). In a step 502 it is checked whether this first criterion is fulfilled, in the affirmative, a second criterion of deterioration of the connection is determined in a step 503. If this second criterion is fulfilled (see step 504), the connection is disabled, e.g., shut down and/or locked. If step 502 or step 504 reveal that the respective criterion is not fulfilled, a Showtime state is entered in a step 506 is. If the second criterion is fulfilled, the connection is disabled in a step 505 by, e.g., shutting down the connection and/or locking the connection. After step 505 a step 507 is entered, wherein a manual reset (e.g., pursuant to a broken wire being repaired) is conducted and/or a predetermined amount of (constant or varying) time is waited until it is branched to step 501.

Although various embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF ABBREVIATIONS

ADSL Asynchronous Digital Subscriber Line
CO Central Office
CPE Customer Premises Equipment
DSL Digital Subscriber Line
DSLAM DSL Access Multiplexer
LATN Line Attenuation
MELT Metallic Line Testing
PSD Power Spectral Density
RFI Radio Frequency Interference
SATN Signal Attenuation
UPBOKLE Estimated Upstream Power Back-Off Electrical length
VTU VDSL Transceiver Unit
VTU-O VTU at the Optical Network Unit (or central office, exchange, cabinet, etc., i.e., operator end of the loop)
VTU-R VTU at the Remote site (i.e., subscriber end of the loop)

The invention claimed is:

1. A method for data processing in a digital subscriber line environment, the method comprising the steps:
    initializing an operational connection over a wire pair that is connected between a centralized unit and a decentralized unit;
    during a subsequent initialization of a connection on the wire pair, determining that an intermittent single wire interruption exists in the wire pair based on differences between initialization parameters obtained during the subsequent initialization and one or more previous initializations;
    disabling the connection on the wire pair based on the determination that the intermittent single wire interruption exists in the wire pair.

2. The method according to claim 1, wherein determining that the intermittent single wire interruption exists comprises determining that intermittent capacitive coupling between the single wire of the wire pair with another wire pair has occurred based on changes to capacitance measurements over multiple initializations of the connection on the wire pair.

3. The method according to claim 1, comprising:
    determining that the connection is being initialized on a wire pair experiencing an intermittent single wire interruption based on an information about changes to an attenuation in a given frequency band over multiple initializations of the connection on the wire pair.

4. The method according to claim 3, wherein the information about changes to the attenuation is provided by measurements of at least one of the following parameters during initialization:
    a line attenuation per band;
    a signal attenuation per band; and
    an estimated upstream power back-off electrical length.

5. The method according to claim 4, further comprising:
    determining a deterioration of the connection by comparing a value of the line attenuation per band with an electrical length value and by comparing the attenuations of two bands.

6. The method according to claim 5, comprising:
    determining that the deterioration of the connection exists when the following first criterion is fulfilled:

$$LATN(US0)>UPBOKLE(VTUO)*X_D+X_A,$$

wherein
LATN(US0) is a line attenuation for the first upstream band US0;

UPBOKLE(VTUO) is an estimated upstream power back-off electrical length value measured by a VDSL Transceiver Unit at the Optical Network Unit (VTU-O);

$X_A$ is a tuning parameter to modify the threshold of the detection; and $X_D$ represents a factor between two attenuations.

7. The method according to claim 5, comprising:
determining the deterioration of the connection based on a loop testing functionality.

8. The method according to claim 7, wherein the testing functionality comprises a line testing functionality determining at least one capacitance value for the connection.

9. The method according to claim 8, comprising:
determining that the deterioration of the connection exists when the following second criterion is fulfilled:

$$C_{ab} < X_L * \max(C_{ae}, C_{be}) + X_C,$$

wherein $C_{ab}$ is a capacitance between a wire a and a wire b of the connection;
$X_L$ is a cable-dependent factor;
$C_{ae}$ is a capacitance between the wire a and earth;
$C_{be}$ is a capacitance between the wire b and earth.

10. The method according to claim 8, comprising:
determining that the deterioration of the connection exists when the following second criterion is fulfilled:

$$C_{ab} < X_L * \max(C_{ae}, C_{be}) * \max(C_{ae}, C_{be}) / \min(C_{ae}, C_{be}) + X_C$$

wherein $C_{ab}$ is a capacitance between a wire a and a wire b of the connection;
$X_L$ is a cable-dependent factor;
$C_{ae}$ is a capacitance between the wire a and earth;
$C_{be}$ is a capacitance between the wire b and earth; and
$X_C$ is an optional tuning parameter to modify the sensitivity of the detection.

11. The method according to claim 5, comprising:
determining the deterioration of the connection based on information about the attenuation and based on a line testing functionality determining at least one capacitance of the connection by comparing a weighted sum with a predetermined threshold as follows:

$$w_a*(\text{LATN(US0)} - \text{UPBOKLE(VTUO)}*X_D'X_A') + +w_c*(X_L*\max(C_{ae}, C_{be})X_C - C_{ab}) > T,$$

and/or $$w_a*(\text{LATN(US0)} - \text{UPBOKLE(VTUO)}*X_D'X_A') + +w_c*(X_L*\max(C_{ae}, C_{be})*\max(C_{ae}, C_{be})\min(C_{ae}, C_{be})X_C - C_{ab}) > T,$$

wherein $w_a$ is a weighting factor for the attenuation-based criterion;
$w_c$ is a weighting factor for the capacitance-based criterion;
T is the predetermined threshold;
LATN(US0) is a line attenuation for the first upstream band US0;
UPBOKLE(VTUO) is an estimated upstream power back-off electrical length value measured by a VDSL Transceiver Unit at the Optical Network Unit (VTU-O);
$X_A'$ is a tuning parameter to modify the threshold of the detection;
$X_D'$ represents a factor between two attenuations;
$C_{ab}$ a capacitance between a wire a and a wire b of the connection;
$X_L$ a cable-dependent factor;
$C_{ae}$ a capacitance between the wire a and earth;
$C_{be}$ a capacitance between the wire b and earth; and
$X_C$ is an optional tuning parameter to modify the sensitivity of the detection.

12. The method according to claim 5 comprising:
determining the deterioration via a first criterion and a second criterion, wherein the first criterion is determined based on a parameter available during initialization and wherein the second criterion is determined if the first criterion is fulfilled; and
disabling the connection in case the first criterion and the second criterion are fulfilled.

13. The method according to claim 12, wherein the first criterion is based on an attenuation provided by at least one of the following parameters:
a line attenuation per band;
a signal attenuation per band; and
an estimated upstream power back-off electrical length.

14. The method according to claim 12, wherein the second criterion is based on a loop testing functionality that provides at least one capacitance value for the connection, wherein the loop testing functionality is initiated by the centralized unit.

15. The method according to claim 1, wherein disabling the connection comprises shutting down the connection and/or locking the connection.

16. The method according to claim 1, wherein disabling the connection comprises entering a fallback mode for the connection, in particular with regard to a predefined frequency range and/or a predefined power spectral density.

17. A telecommunications network transceiver in a digital subscriber line environment comprising a vectoring unit and a processing unit that is arranged
for initializing an operational connection over a wire pair that is connected between a centralized unit and a decentralized unit;
during a subsequent initialization of a connection on the wire pair, determining that an intermittent single wire interruption exists in the wire pair based on differences between initialization parameters obtained during the subsequent initialization and one or more previous initializations;
for disabling the connection on the wire pair based on the determination that the intermittent single wire interruption exists in the wire pair.

18. The device according to claim 17, wherein the device is a DSLAM or a central office.

19. The device according to claim 17, wherein determining that the intermittent single wire interruption exists comprises determining that intermittent capacitive coupling between the single wire of the wire pair with another wire pair has occurred based on changes to capacitance measurements over multiple initializations of the connection on the wire pair.

* * * * *